United States Patent Office 2,888,448
Patented May 26, 1959

2,888,448

COORDINATION CATALYSTS USING SILVER

William Franklin Gresham and Nicholas George Merckling, Wilmington, Del., assignors to E. I. du Pont de Nemours and Company, Wilmington, Del., a corporation of Delaware No Drawing. Application September 16, 1954
Serial No. 456,617

4 Claims. (Cl. 260—94.9)

This invention relates to novel catalyst systems and more particularly to catalyst systems useful in the polymerization of ethylene to solid polymers employing silver coordination complexes and to the process of polymerizing ethylene using novel silver catalyst systems.

Heretofore, it has been widely known that ethylene can be converted to solid polymers under very high pressure in the presence of catalysts which are capable of yielding free radicals under polymerization conditions.

It has also been known heretofore (U.S. Patents 2,212,155, 2,475,520, 2,467,234) that certain metal alkyls and Grignard reagents are capable of initiating the conversion of ethylene to solid polymers through a free radical mechanism at high pressures. Ethylene has also been converted to solid polymers in the presence of alkali metals or alkali metal hydrides (British Patent 536,102).

Redox systems have frequently been disclosed for polymerization of olefins. In many of these systems a heavy metal compound was employed in combination with a reducing compound (cf. U.S. Patents 2,380,473 and 2,383,425). In some redox catalyst systems, silver ions have been used as activators, in which the silver ion enhances the free radical formation of the peroxygen compounds used in said redox systems. Thus although silver ions are used in redox systems to overcome induction periods and lower reaction conditions, they are not necessarily needed to initiate olefin polymerization and will not act as catalysts for the polymerization of olefins when used in the absence of other components of the redox system. The polymerization of olefins and ethylene in particular using only certain silver complexes, believed to be novel in themselves, as a catalyst, has heretofore not been accomplished.

It has now been discovered in accordance with the present invention that extraordinary and highly useful effects are produced by combining certain silver complexes, as described hereinbelow, with organic compounds containing ethylenic unsaturation. In specific embodiments, it has been found that silver salts, when reacted with excess molar amounts of a strong alkylating agent such as compounds containing at least one hydrocarbon to metal bond, e.g. Grignard reagents, metal alkyls, metal aryls, will form a complex which on being admixed with an ethylenically unsaturated olefin, such as ethylene, will catalyze the polymerization of said olefin.

Although we do not wish to be bound by the explanation, it is believed that the distribution of electrons in the silver is changed into that of a highly reactive state on combining with one of the compounds of the class mentioned hereinabove. The resulting complex containing silver in this highly reactive state will then combine with ethylene to form what may be called a coordination complex capable of causing the polymerization of ethylene. The nature of these coordination complex catalysts is not fully understood and their isolation is sometimes difficult. Their presence, however, can be determined from the chemical properties of the mixtures produced when a silver compound is reacted with an alkylating agent of the class said hereinabove in the presence of organic compounds such as ethylene. It is believed that these coordination complexes hereinabove described are novel compounds.

Since the activity of the silver in the complex depends on the ability of the organometallic compound to react with the silver and to form complex compounds with a favorable electronic distribution, it is quite possible that other similar agents such as metal hydrides will form active complexes which can coordinate with ethylenically unsaturated compounds to give the novel coordination complex catalysts described hereinabove. These latter complexes, however, may not have catalytic activity of the same degree in the presence of ethylenically unsaturated compounds, as the coordination complexes formed by silver compounds and compounds having at least one metal to hydrocarbon bond.

While the polymerization of ethylene to produce solid polymers in the presence of the catalysts herein disclosed can be carried out under extremely mild conditions it is preferable to employ moderately high pressures, suitably from 1 to 200 atmospheres or higher, in order to facilitate the handling of ethylene. Much higher pressures, up to several thousand atmospheres, can be employed, but it is not economically desirable to do this in view of the extraordinary activity of the catalyst at lower pressures. The temperatures to be used in the process of this invention are within the range of about 0° to 300° C.

The polymerization of ethylene according to the process of this invention takes place most satisfactorily when the polymerization mixture is substantially moisture-free and also free of other sources of hydroxyl groups. As in numerous other ethylene polymerization processes, the polymerization mixture in the process of this invention should be kept free of oxygen or at least the oxygen content should be held below 20 parts per million. Certain compounds which are capable of coordinating with the active silver complex, formed on reaction with an alkylating compound of the class hereinabove described, form complexes which are too stable for optimum results, and accordingly, the presence of these compounds should preferably be avoided. In this category are acetone, and certain esters. Hydrocarbons, on the other hand, can be used quite effectively as reaction media.

In specific embodiments the polymerization mixtures, especially those employing inert solvents such as hydrocarbons, are homogeneous and contain the active coordination complex in a dissolved form. The homogeneous catalysts systems often have certain advantages over heterogeneous catalyst systems. In the homogeneous systems, the polymerization takes place very readily in the presence of a relatively small amount of the coordination complex. In contrast with this, a somewhat larger quantity of catalyst is necessary if a heterogeneous system is employed, especially if the effective surface area of the catalyst is not extremely large. Better results are obtained in heterogeneous catalysis if the catalyst is colloidally dispersed. The catalyst may be formed in situ or stored at low temperatures in the absence of water and oxygen.

The activity of the catalyst depends in part upon the nature of the group which is originally attached to the silver atom. Certain groups such as iodides do not permit the formation of the active silver cordination complex upon reaction with a Grignard reagent, for example, in the presence of ethylene. On the other hand, chlorides, fluorides, and nitrates do not interfere in the formation of the active complex. It is quite possible that this effect depends upon the amount of shielding of the groups attached to the silver and influences the activity of the catalyst by reducing the tendency of the silver to coordinate.

The activity of the novel catalysts described hereinabove is of such a nature that the catalyst is well suited for polymerizations of ethylenically unsaturated compounds other than the polymerization of ethylene, such as the polymerization of propylene, butadiene, styrene, etc.

The quantity of catalyst employed can be varied over a rather wide range but it is desirable to employ a quantity of catalyst which is at least large enough to produce a reasonably rapid rate for a reasonably long period of time. In general, the quantity is within the range of 0.001% to 10% based on the weight of the monomer.

The following examples are given to further illustrate the process of this invention:

*Example 1.*—Silver chloride (0.01 mol) was dispersed in 100 ml. of cyclohexane and 0.02 mole of phenyl magnesium bromide dissolved in diethylether was added to the mixture under a blanket of nitrogen. The resulting mixture was then introduced into a 325 ml. shaker tube, the tube pressured to 1,000 p.s.i. with ethylene and the mixture shaken at 75° C. for a period of 2 hours. The resulting solid polymer was washed with methanol and hydrochloric acid in methanol, and finally with acetone and then dried overnight in an air oven at 70° C. The yield of the polymer was 2 grams. The polymer could be compression molded at 200° C. into a tough film.

*Example 2.*—Into a shaker tube was placed 10 ml. of a 3 M solution of ethylmagnesium bromide in diethylether diluted with 15 ml. of benzene under a blanket of $N_2$. To this solution was added 0.5 g. of silver difluoride in 25 ml. of benzene and 25 ml. of heptane. Thereupon the shaker tube was flushed with nitrogen and evacuated. The shaker tube was pressured with ethylene to 2000 p.s.i. at 180° C. and agitated for a period of two hours. The resulting polymer was washed with dilute hydrochloric acid, dilute nitric acid, and acetone. A tough film could be obtained by compression molding the polymer at 200° C. under 20,000 p.s.i. pressure for three minutes. The density of the polymer was 0.96.

*Example 3.*—Into a shaker tube was placed 0.01 mole of silver nitrate in 100 cc. of cyclohexane, and 0.01 mole of ethylmagnesium bromide dissolved in diethyl ether was added under a blanket of nitrogen. The shaker tube was evacuated, flushed with nitrogen and re-evacuated and then heated to 100° C. and pressured with ethylene to 1000 p.s.i. The shaker tube was agitated for a period of 60 minutes and the resulting polymer was filtered from the reaction mixture. The polymer was washed with successive portions of acetone, a methanol and hydrochloric acid mixture, a methanol and aqueous sodium hydroxide mixture and finally with methanol, and then dried in an oven at reduced pressure and 70° C. The resulting polymer was tough and had a density of 0.95 and an inherent viscosity of 8.5 in tetrahydronaphthalene.

The polymers which are made under the conditions hereinabove described frequently have such high molecular weights that removal of catalysts by dissolving and filtering is extremely difficult. The best procedure for obtaining the polymer in a clean form is to wash with acetone and methanol-hydrochloric acid mixtures followed by washing with acetone and acetone-aqueous sodium hydroxide mixtures and finally followed by a water wash. The products thus obtained are generally white. Other washing procedures will be apparent to those skilled in the art.

The ethylene polymers obtained in accordance with the process of this invention are highly valuable in numerous applications, especially in the form of films, molded articles, extruded insulation on wire, etc.

We claim:

1. A process for polymerizing ethylene which comprises contacting ethylene, at a temperature of 0 to 300° C. and at a pressure of 1 to 200 atmospheres, in the presence of an inert organic solvent, with from 0.001 to 10 percent by weight of the ethylene of a catalyst obtained by admixing a silver halide with a Grignard reagent, the molar ratio of said Grignard reagent to said metal halide being at least two, and recovering a solid polymer of ethylene.

2. The process as set forth in claim 1 wherein the silver halide is silver fluoride.

3. The process as set forth in claim 1 wherein the silver halide is silver chloride.

4. The process as set forth in claim 1 wherein the Grignard reagent is phenyl magnesium bromide.

References Cited in the file of this patent
UNITED STATES PATENTS

| | | |
|---|---|---|
| 2,475,520 | Roedel | July 5, 1949 |
| 2,520,959 | Powers | Sept. 7, 1953 |
| 2,634,258 | Stewart | Apr. 7, 1953 |
| 2,762,791 | Pease et al. | Sept. 11, 1956 |

OTHER REFERENCES

Journal of Organic Chemistry, vol. 5 (1940), pages 126–132.

Annalen 567, pages 43–96 (1950).

Kharasch: 1954 Grignard Reactions of Non-Metallic Substances, page 119.